J. H. MOCK.
INSECT DESTROYER.
APPLICATION FILED NOV. 26, 1913.
1,133,567.
Patented Mar. 30, 1915.
2 SHEETS—SHEET 1.
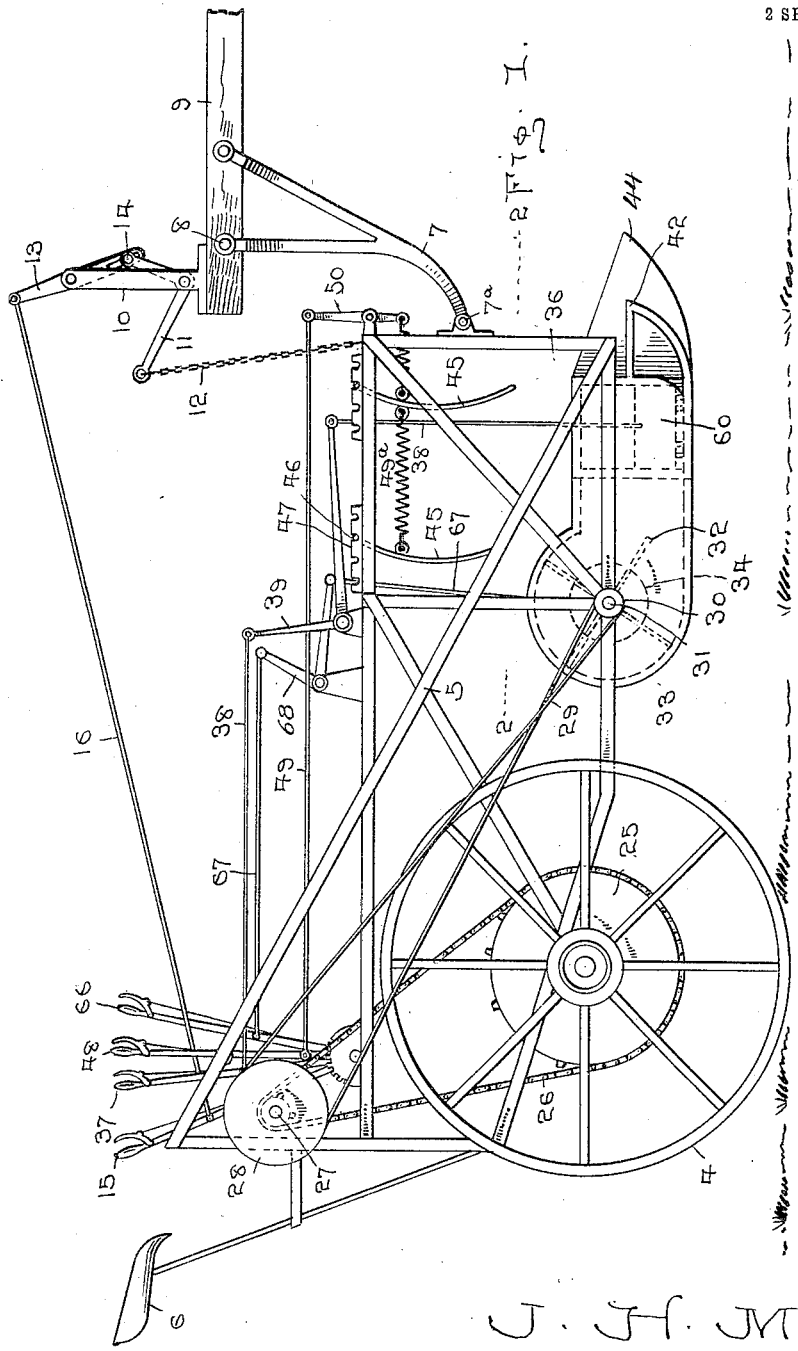
Witnesses
Thos. W. Riley
Chas. P. Siebold
Inventor
J. H. Mock
By W. J. Fitz Gerald
Attorneys J. H. MOCK.
INSECT DESTROYER.
APPLICATION FILED NOV. 26, 1913.
1,133,567.
Patented Mar. 30, 1915.
2 SHEETS—SHEET 2.
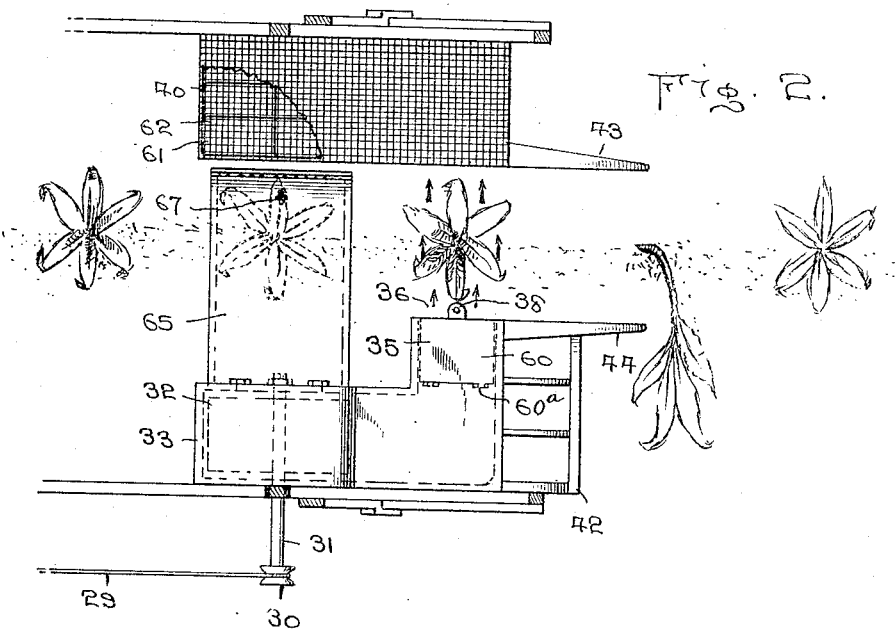
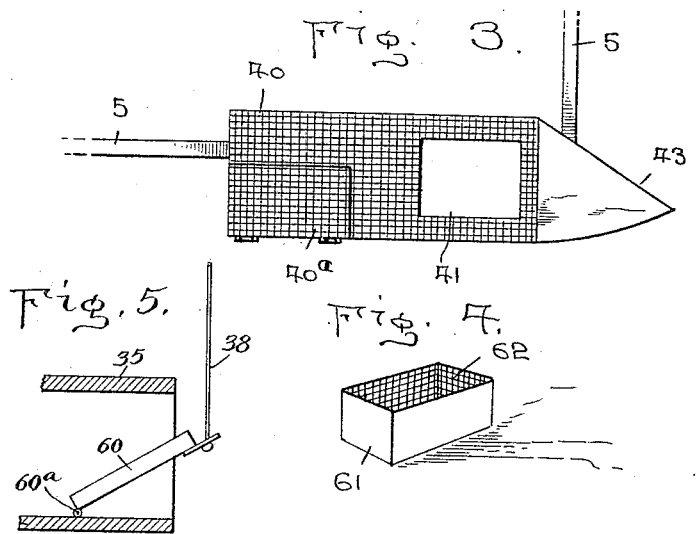
Witnesses
Inventor
J. H. Mock
By W. J. Fitzgerald
Attorneys

UNITED STATES PATENT OFFICE.

JOHN H. MOCK, OF JETMORE, KANSAS.

INSECT-DESTROYER.

1,133,567.   Specification of Letters Patent.   Patented Mar. 30, 1915.

Application filed November 26, 1913.   Serial No. 803,242.

*To all whom it may concern:*

Be it known that I, JOHN H. MOCK, a citizen of the United States, residing at Jetmore, in the county of Hodgeman and State of Kansas, have invented certain new and useful Improvements in Insect-Destroyers; and I do hereby declare the following to be a full, clear, and exact description of the invention, such as will enable others skilled in the art to which it appertains to make and use the same.

The object of this invention is the provision of a wheel mounted machine adapted to be conveyed by suitable draft animals or device to generate a draft of air for blowing and sucking the insects from the plants and into a suitable receptacle.

A further object is to provide a device of this character having various adjustments whereby it may be employed for catching insects from substantially any sized plants.

A further object is to provide a device of this character with spring actuated agitators adapted to engage the tops of tall plants so as to shake the insects therefrom.

In the accompanying drawings, Figure 1, represents a side elevation of the machine. Fig. 2, represents a sectional view on the line 2—2 of Fig. 1. Fig. 3, represents a detail view in side elevation of the insect receiving receptacle, and Fig. 4, represents perspective view of one of a series of pans located in the insect receiving receptacle.

Referring to the drawings in detail, the numeral 4 indicates the wheels of the machine over which is mounted a frame 5 consisting of a plurality of bars suitably arranged and connected. The rear end of the frame 5 is provided with a seat 6 for the operator, while the front end is pivotally connected at 7ª to a depending bracket 7, secured at 8 to the tongue 9.

A pair of spaced standards 10, are secured at the extreme rear end of the tongue 9, and pivotally receive a bell crank 11, one end of which is connected by a chain 12 to the forward end of the frame 5. A lever 13, is pivoted between the extreme upper ends of the standards 10 and is pivotally connected at 14 with the other arm, of the bell crank 11. The upper end of the lever 13 is connected with a hand lever 15 by a connecting rod 16, and said hand lever 15 is provided with a suitable locking device. It is obvious that by simply releasing the locking device and allowing the hand lever to swing forwardly the weight of the frame 5 would cause the front end of the machine to drop, or, after having been lowered the hand lever 15 may be swung rearwardly raising with it the front end of the machine. By this arrangement the fan spout and insect receiver can be allowed to run on the runners attached thereto or they may be swung clear and carried by the tongue at the will of the operator.

The wheels of the frame 5 are preferably fixed upon their axle so as to positively drive the sprocket wheel 25 which is also mounted upon said axle and thus drive the sprocket chain 26 and shaft 27 over which the upper portion of the sprocket chain 26 travels. A large pulley 28 is fixed on the shaft 27 and receives a belt or the like 29, also working over a pulley 30 fixed to the shaft 31, of the rotary blower comprising a casing 33 and blades 32. The inner wall of the casing 33 is provided adjacent the shaft 31, with an air intake opening 34 while the forward end thereof is provided with an inwardly directed spout 35 adapted to direct the air blown by the fan on a line at right angles to the path of the machine. The open end of the spout 35 is provided with a hinged gate or valve 60 hinged at 61, to the bottom wall of the spout and adapted to be adjusted at the desired angle by a suitable hand lever 37, connected therewith by rods 38 and a bell crank 39.

A perforate insect receiving receptacle 40 is secured to the frame 5 in the same horizontal plane as the spout 35 and is provided with an opening or mouth 41 located directly in the path of the blast of air issuing from the open end of said spout whereby the insects carried off of the plants will be deposited into the receptacle 40 through its mouth 41. A large pan fits snugly within the lower portion of the receptacle 40 and receives a plurality of smaller pans 61 which are adapted to be filled with oil or the like for destroying insects. Each smaller receptacle 61, is provided with a movable screen lining 62 by means of which the bugs may be removed from the pans without necessarily removing the oil. The receptacle 40 is preferably provided with a door 40ª.

The spout 35 and receptacle 40 are provided with forwardly and upwardly curved runners 42 and 43 respectively adapted to guide these parts over obstructions in the path of the machine and support them when in contact with the ground. The spout and receptacle are also provided with a forwardly extended arm or turner 44 adapted to engage the stalks of fallen plants and guide them into the space between the spout and receptacle so that they may be acted upon by the blast of air from the spout.

A hood 65 is pivoted to the fan casing 33 on a horizontal axis adjacent the intake opening 34 therein and is adapted to partially inclose the plants for the purpose of preventing the escape of any of the insects, by preventing them from rising in the air when disturbed by the agitators, and also serving to direct them to the intake opening 34 that they may be drawn in with the air and driven out through the spout 35 into the receptacle 40. The hood may be raised or lowered as desired by a suitable hand lever 66 connected therewith by rods 67, and a bell crank 68.

Agitator members 45 consisting of a plurality of tines fixed on shafts 46 are adapted to be seated within any one of a plurality of notches formed in plates 47 secured to portions of the frame 5. The tines of the agitators are adapted to engage the plants to shake the insects therefrom. A hand lever 48 is pivoted to the frame 5 adjacent the seat 6 and is connected by a rod 49, lever 48, and springs 49$^a$ with the agitators 45 for the purpose of controlling the tension of the agitators while in contact with the plants.

What I claim as new is:

1. An insect destroyer comprising a frame; two drive wheels supporting said frame; a fan carried by said frame within a casing located forward of the axle of said wheels, connections for driving said fan by movement of said drive wheels; a spout connecting with said fan; a valve hingedly mounted upon the bottom of said spout, and means for operating said valve; a hood pivotally connected to the fan casing, means for raising said hood operated from the driver's seat; a perforate receptacle spaced from said spout and adapted to receive air therefrom; shafts adjustably mounted above said spout; a plurality of depending plant engaging tines secured to said shafts having operable means connected to said tines and located near the driver's seat; and runners supporting the said air spout and said perforate receptacle when in contact with the ground.

2. An insect catching device comprising an insect receptacle having receiving pans in the bottom thereof constituting one section of said device, a fan and air spout constituting the other coöperating section, mounted on two supporting wheels, the insect catching mechanism located forward of the axle and the driver's seat and operating levers behind the axle; a plurality of depending, adjustable agitators, controlled from the driver's seat by the operator; an adjustable hood pivotally mounted adjacent the air intake opening of the fan casing and means for operating the said hood from the driver's seat; a valve hingedly mounted on the bottom of the said air spout, controlled by the operator from the driver's seat, whereby the current of air may be directed upwardly at will; supporting runners connected to and supporting the said insect receptacle and the said air spout, when they are in contact with the ground and a plurality of perforate, removable, inner linings for the said pans.

3. An insect destroyer, including a frame mounted on two wheels; a fan carried by said frame having an intake opening on the side of the casing of said fan adjacent the plants being worked on; a hood pivotally mounted above said opening; a valve hingedly mounted on the bottom of the air spout leading from said fan and means for operating the same; a plurality of depending tines carried by adjustably mounted rods over the said air spout, a perforate receptacle spaced opposite the said fan and air spout, having insect receiving pans therein; a plurality of perforate removable linings for said pans and runners attached to said air spout and receptacle whereby they are supported when in contact with the ground.

In testimony whereof I have signed my name to this specification in the presence of two subscribing witnesses.

JOHN H. MOCK.

Witnesses:
O. M. HANON,
ROSCOE H. WILSON.

Copies of this patent may be obtained for five cents each, by addressing the "Commissioner of Patents, Washington, D. C."